US007930742B2

(12) United States Patent
Chang et al.

(10) Patent No.: US 7,930,742 B2
(45) Date of Patent: Apr. 19, 2011

(54) MULTIPLE-LEVEL DATA PROCESSING SYSTEM

(75) Inventors: Chih-Jen Chang, Hsinchu County (TW); Shi-Ming Zhao, Taipei (TW); Shih-Wei Chien, Hsin-Chu (TW)

(73) Assignee: Lionic Corporation, Science-Based Industrial Park, Hsinchu (TW)

( * ) Notice: Subject to any disclaimer, the term of this patent is extended or adjusted under 35 U.S.C. 154(b) by 1218 days.

(21) Appl. No.: 11/422,087

(22) Filed: Jun. 5, 2006

(65) Prior Publication Data
US 2006/0206939 A1 Sep. 14, 2006

Related U.S. Application Data

(63) Continuation-in-part of application No. 10/868,665, filed on Jun. 14, 2004.

(51) Int. Cl.
*H04L 9/00* (2006.01)
(52) U.S. Cl. .......... 726/22; 370/331; 713/153; 709/203
(58) Field of Classification Search .......... 370/331, 370/394; 713/153, 160; 709/203, 224; 726/22
See application file for complete search history.

(56) References Cited

U.S. PATENT DOCUMENTS

| 5,832,228 | A | * | 11/1998 | Holden et al. | ............. 709/225 |
|---|---|---|---|---|---|
| 5,982,891 | A | | 11/1999 | Ginter | |
| 6,487,666 | B1 | | 11/2002 | Shanklin | |
| 6,598,034 | B1 | | 7/2003 | Kloth | |
| 6,609,205 | B1 | | 8/2003 | Bernhard | |
| 6,768,726 | B2 | * | 7/2004 | Dorenbosch et al. | ......... 370/331 |
| 6,792,546 | B1 | | 9/2004 | Shanklin et al. | |
| 6,880,087 | B1 | | 4/2005 | Carter | |
| 7,058,968 | B2 | * | 6/2006 | Rowland et al. | ................... 726/1 |
| 7,180,895 | B2 | * | 2/2007 | Smith | ........................ 370/394 |
| 7,185,081 | B1 | | 2/2007 | Liao | |

(Continued)

FOREIGN PATENT DOCUMENTS

| GB | 2 417 655 A | 3/2006 |
|---|---|---|
| TW | 589900 | 6/2004 |

OTHER PUBLICATIONS

Elliot Berk, JLex:A lexical analyzer generator for Java(TM), Sep. 6, 2000, http://www.cs.pitt.edu/~mock/cs2210/handouts/jlex-manual.pdf.

(Continued)

*Primary Examiner* — Brandon S Hoffman
*Assistant Examiner* — Michael Anderson
(74) *Attorney, Agent, or Firm* — Winston Hsu; Scott Margo (57) ABSTRACT

Methods and systems for processing multiple levels of data in system security approaches are disclosed. In one embodiment, a first set and a second set of resources are selected to iteratively and independently reverse multiple levels of format conversions on the payload portions of a data unit from a first file and a data unit from a second file, respectively. The first file and the second file are associated with a first transport connection and a second transport connection, respectively. Upon completion of the aforementioned reversal operations, the payload portions of a first reversed data unit and a second reversed data unit, which correspond to the data unit of the first file and the data unit of the second file, respectively, are inspected for suspicious patterns prior to any aggregation of the data units of the first file or the second file.

20 Claims, 9 Drawing Sheets

U.S. PATENT DOCUMENTS

| | | | |
|---|---|---|---|
| 7,308,715 | B2 | 12/2007 | Gupta |
| 7,568,227 | B2 * | 7/2009 | Lyle et al. ............... 726/22 |
| 7,596,809 | B2 * | 9/2009 | Chien et al. ............. 726/22 |
| 2002/0124187 | A1 | 9/2002 | Lyle |
| 2002/0129140 | A1 * | 9/2002 | Peled et al. ............. 709/224 |
| 2002/0171566 | A1 * | 11/2002 | Huang et al. ............. 341/50 |
| 2003/0004689 | A1 | 1/2003 | Gupta |
| 2003/0051043 | A1 | 3/2003 | Wyschogrod |
| 2003/0123447 | A1 | 7/2003 | Smith |
| 2003/0221013 | A1 | 11/2003 | Lockwood |
| 2004/0105298 | A1 | 6/2004 | Symes |
| 2005/0055399 | A1 * | 3/2005 | Savchuk ............... 709/203 |
| 2005/0172337 | A1 * | 8/2005 | Bodorin et al. ............ 726/22 |
| 2005/0278781 | A1 | 12/2005 | Zhao |
| 2006/0005241 | A1 | 1/2006 | Zhao |
| 2006/0053180 | A1 * | 3/2006 | Alon et al. ............. 707/204 |
| 2007/0006300 | A1 * | 1/2007 | Zamir et al. ............. 726/22 |

OTHER PUBLICATIONS

James Moscola, et al, "Implementation of a Content-Scanning Module for an Internet Firewall", Field-Programmable Custom Computing Machines, FCCM 2003. Proceedings the 11th Annual IEEE Symposium on Apr. 9-11, 2003, Piscataway, NJ, USA, IEEE. XP010655273; ISBN 0-7695-1979-2.

Aho, Sethi, Ullman, "Compilers", 1986, Sec 3.7, p. 121-128. XP002381613.

C. Scott Ananian, "JLex: A Lexical Analyzer Generator for Java(TM)", version 1.2.6, Feb. 7, 2003, p. 1-2, Internet. XP002382680.

Reetinder Sidhu, et al, "Fast Regular Expression Matching using FPGAs" Field-Programmable Custom Computing Machines, 2001. FCCM'01. The 9th annual IEEE Symposium on rohnert park, CA, USA, Apr. 29, 2001, paragraph 02.4. XP010789123; ISBN 0-7695-2667-5.

Christopher R. Clark, et al, "A pattern-matching co-processor for network intrusion detection systems" Field-Programmable Technology (FPT), Proceedings 2003 IEEE International Conference on Dec. 15-17, 2003, Piscataway, NJ, USA, IEEE, pp. 68-74. XP010688321; ISBN 0-7803-8320-6.

Lin et al., "A Stream-Based Mail Proxy With Interleaved Decompression and Virus Scanning", IASTED International Conference: Software Engineering and Applications, Nov. 14-16, 2005, USA.

* cited by examiner

MULTIPLE-LEVEL DATA PROCESSING SYSTEM

CROSS REFERENCE

This application is a continuation-in-part of U.S. application Ser. No. 10/868,665 filed on Jun. 14, 2004, which is incorporated herein by reference in its entirety.

FIELD

This patent document generally relates to system security approaches, especially a multi-level data processing system that can be employed in such system security approaches.

BACKGROUND

Unless otherwise indicated herein, the approaches described in this section are not prior art to the claims in this application and are not admitted to be prior art by inclusion in this section.

Some of the most malicious software, also known as malware, capable of crippling a computing device or even an entire corporate network, are being distributed worldwide via electronic mail ("email") and email attachments. As individuals and businesses become increasingly dependent on email communications, the likelihood of such programs setting off disruptive consequences has also increased considerably. Further complicating the matter is that some email attachments are compressed to conserve communication bandwidth. Finding malware in such compressed attachments generally involves decompressing the entire compressed attachments before scanning the uncompressed version of the attachments.

One approach employed by existing anti-virus solutions is to filter out an attachment file based on its extension. Thus, if the attachment file has a known compression extension, such as zip, then the attachment file is blocked from reaching users of such solutions. However, since this approach does not inspect the content of the attachment file, a legitimate and a malware-free attachment file may be erroneously filtered out.

Another approach employed by the anti-virus solutions is to recommend or even require a user of the solutions to decompress and scan the compressed attachment file for malware prior to permitting the user to access the file. After an affirmative act by the user, such as manually electing to start the decompressing and scanning process, the entire attachment file is temporarily stored either on the user's computing device or on the mail server on the network for processing. Unlike the first approach discussed above, this approach inspects the content of the attachment file. However, the inspection takes place only after the entire file is stored and decompressed. By its nature, a compressed file tends to contain a large amount of information when it is in its uncompressed state. Since the entire uncompressed file is stored and inspected, this approach consumes significant processing and memory resources. When faced with multiple attachments from different email sessions concurrently, the resource requirements of this approach renders the implementation of the approach impractical and prohibitively expensive.

As the foregoing illustrates, what is needed is a way to efficiently and yet thoroughly inspect the content of these compressed attachment files in email communications.

SUMMARY OF THE INVENTION

Methods and systems for processing multiple levels of data in system security approaches are disclosed. In one embodiment, a first set of resources is selected to iteratively reverse multiple levels of format conversions on the payload data of a data unit. This data unit is part of a first file, which is associated with a first transport connection. Independently, a second set of resources is also selected to iteratively reverse multiple levels of format conversions on the payload data of a data unit. This data unit is part of a second file, which is associated with a second transport connection. Upon completion of the aforementioned reversal operations, the payload data of a first reversed data unit and a second reversed data unit, which correspond to the data unit of the first file and the data unit of the second file, respectively, are inspected for suspicious patterns. The inspection of the first and the second reversed data units occur prior to any aggregation of the data units of the first file or the second file.

DETAILED DESCRIPTION

Methods and systems for processing multiple levels of data in system security approaches are described. In the following description, for the purposes of explanation, numerous specific details are set forth in order to provide a thorough understanding of the present invention. It will be apparent, however, to one skilled in the art that the present invention may be practiced without these specific details.

Certain computing and programming theories and networking protocols are well known in the art and will not be elaborated in detail. However, throughout this disclosure, any two data processing operations are said to be "in parallel," when at least some portions of the operations are performed at the same time. Each "data unit" generally refers to data that are stored in a particular memory location or a packet with a destination address. The reversal of one format conversion of a data unit is referred to as a single "level" data processing. So, if a data unit has been encoded and also compressed, then a two-level data processing, namely decompressing and decoding, is needed to reverse the two format conversions.

"Data-unit-based" processing generally refers to operations performed on a single data unit without any precondition of assembling and combining multiple data units.

1.0 System Overview

A multi-level data processing system ("MDPS") is capable of allocating resources to perform multiple data-unit-based processing in parallel. Some illustrative types of such processing include, without limitation, decoding, decompressing, unarchiving, and any reversing of a format conversion for email attachment files from multiple TCP connections in parallel on a data-unit-by-data-unit basis. For each of the email attachment files, the multi-level processing capability of the data-unit-based processing discussed above is invoked if the format of the file has been converted more than once.

Figure 1:
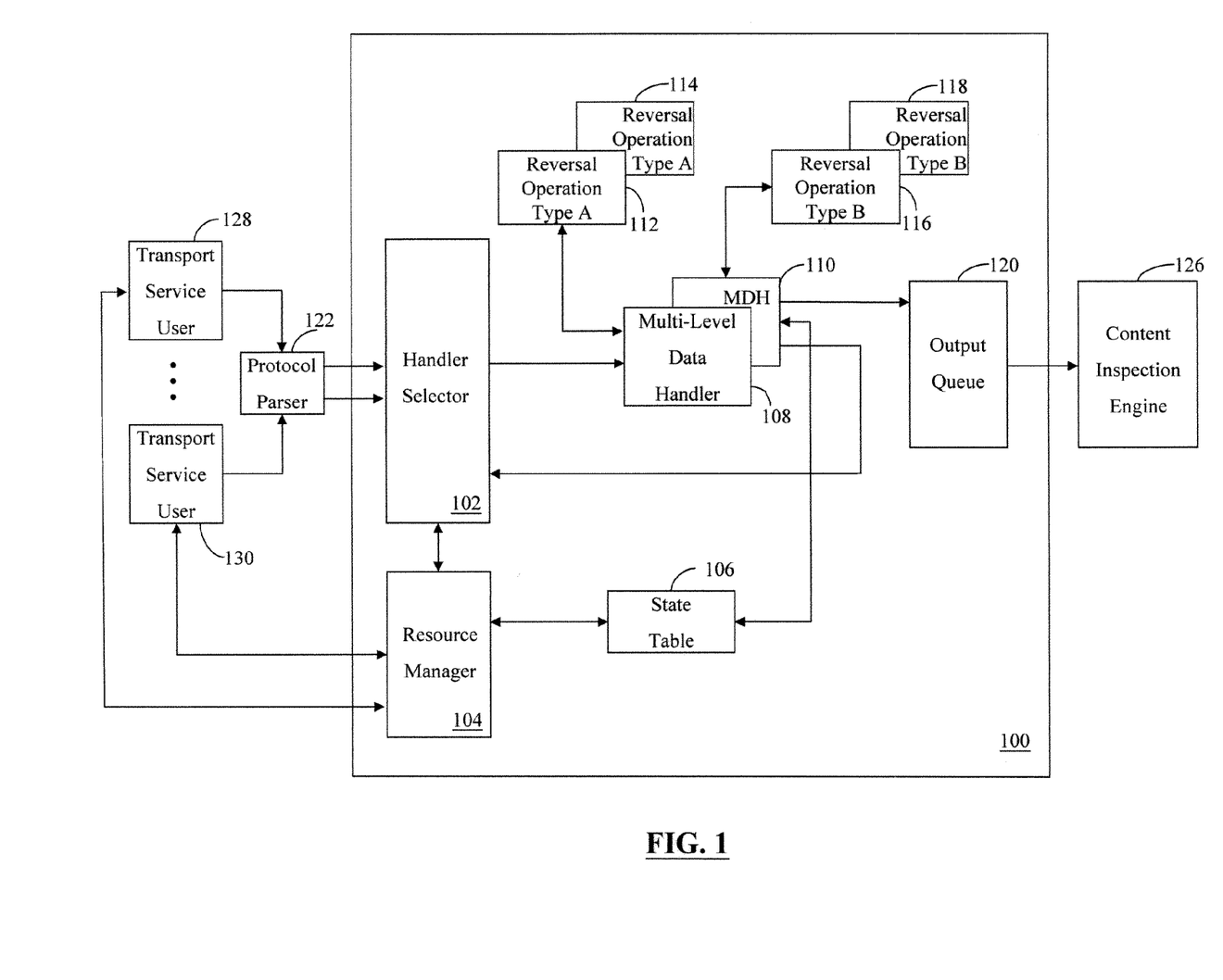
FIG. 1 is a conceptual diagram of a multi-level data processing system, according to one embodiment of the present invention.

FIG. 1 is a conceptual diagram of a MDPS, such as MDPS 100, according to one embodiment of the present invention. Specifically, MDPS 100 includes at least handler selector 102, resource manager 104, state table 106, multiple multi-level data handlers ("MDH"), such as MDHs 108 and 110, output queue 120, and multiple instances of varying types of data processing blocks, such as reversal operation type A blocks 112 and 114 and reversal operation type B blocks 116 and 118. Some examples of these reversal operation types include, without limitation, decoding, decompressing, and unarchiving an email attachment file. Moreover, MDPS 100 supports both the commonly known and the proprietary reversal processing methods. For the commonly known reversal processing methods, MDPS 100 is capable of decoding formats such as, without limitation, Base64, quoted-printable, and UUENCODE. MDPS 100 is also capable of decompressing formats such as, without limitation, ZIP, GZIP, and RAR and is capable of unarchiving formats such as, without limitation, TAR and CPIO.

One embodiment of MDPS 100 is also coupled to protocol parser 122 and content inspection engine 126. Protocol parser 122 generates and directs MDPS-data-units that characterize the data from transport service users, such as 128 and 130 shown in FIG. 1, to handler selector 102. Subsequent discussions will detail the process that protocol parser 122 follows and also one format of a MDPS-data-unit. Some examples of a transport service user include, without limitation, a Simple Mail Transfer Protocol ("SMTP") client, a File Transfer Protocol ("FTP") client, a Hyper Text Transfer Protocol ("HTTP") client, and a Post Office Protocol 3 ("POP3") client. After MDPS 100 has an opportunity to process the MDPS-data-units, content inspection engine 126 examines the processed results for suspicious patterns. Content inspection engine 126 generally supports a data-unit-based inspection mechanism, which is disclosed and claimed in the U.S. application Ser. No. 10/868,665 filed on Jun. 14, 2004.

Handler selector 102 is mainly responsible for interacting with resource manager 104 to track resources of MDPS 100 and designates certain MDHs, such as MDH 108 and 110, to handle the incoming data from the transport service users via protocol parser 122. In one implementation, handler selector 102 may designate one or more MDHs for each TCP connection, and the designation of a MDH spawns a process. This spawned process is referred to as a "MDH process" and is used interchangeably with MDH throughout this disclosure. Each MDH operates independently from one another and has access to a set of resources, such as one or more data processing blocks and storage. As each MDH processes the incoming data, the MDH keeps certain state information of the processing in state table 106 and also feeds certain information back to handler selector 102. After the MDH completes the processing of the incoming data, it places the results in output queue 120. Subsequent sections will provide detailed discussions of the interactions among these various components of MDPS 100.

MDPS 100 supports a finite number of MDHs. For each of the supported MDHs, resource manager 104 allocates at least a table entry in a finite sized state table 106. In one implementation, the table entry may contain identification information, status information, state information, and resource information. Specifically, the identification information may be a MDPS session number, which uniquely corresponds to a specific TCP connection and any MDH that is designated to process the data on this TCP connection. The status information indicates the availability of the designated MDH. The state information provides a snapshot of any processing the designated MDH may have undertaken. Lastly, the resource information tracks the resources the designated MDH utilizes, such as the FIFO buffers and the data processing blocks mentioned above. Subsequent paragraphs will further detail the management of state table 106 and the allocation and the de-allocation of the resources.

1.1 Protocol Parser

Figure 2A:
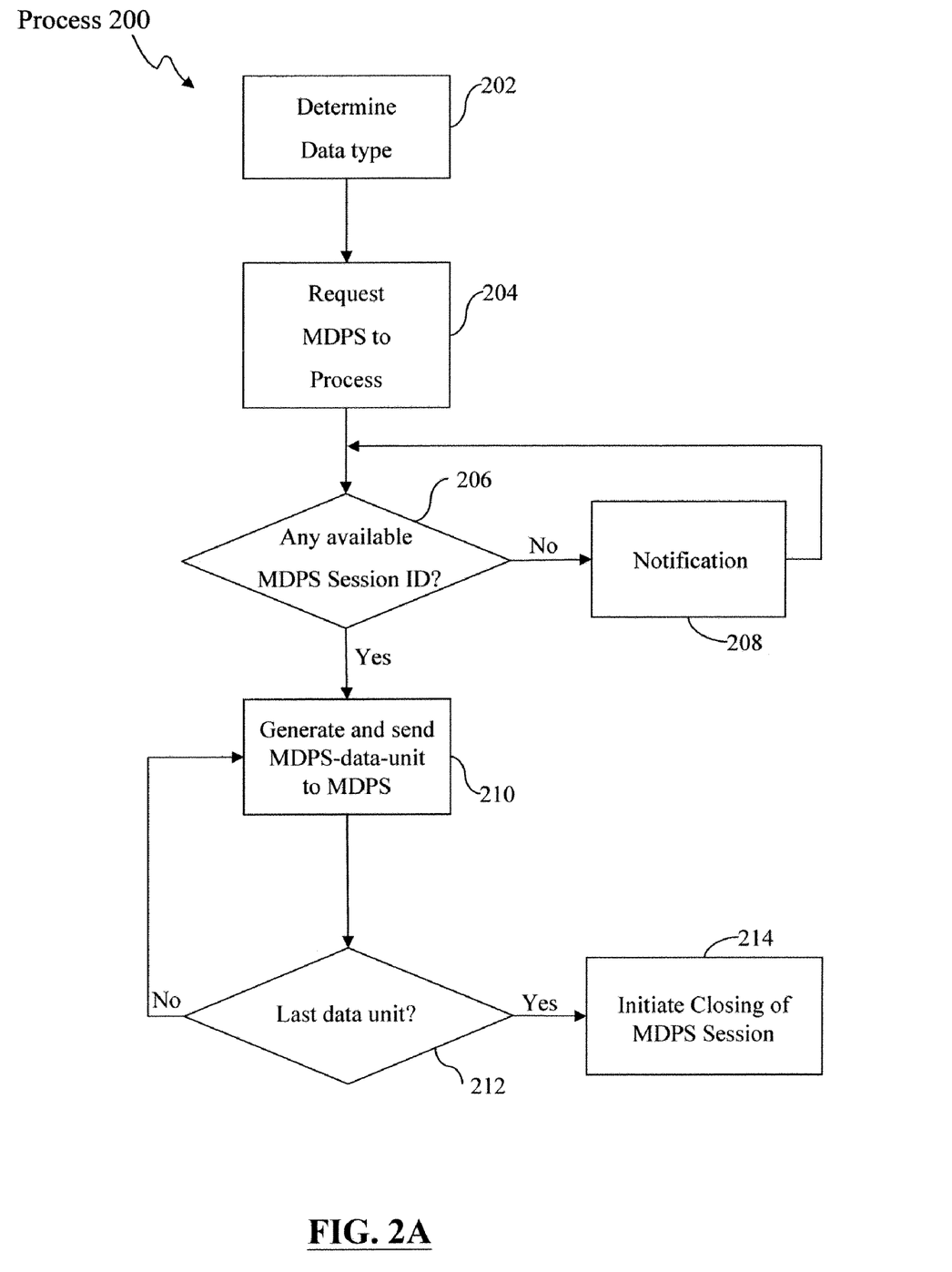
FIG. 2A illustrates one process a protocol parser follows to interact with a multi-level data processing system.

FIG. 2A illustrates one process, process 200, that protocol parser 122 follows to interact with MDPS 100. Specifically, after the transport service users 128 and 130 shown in FIG. 1 establish the TCP connections and perform the requisite handshaking pursuant to the protocols they support, the transport service users send the data units received during the data phase of the TCP connections to protocol parser 122. Each of these TCP connections is identified by a tuple of at least a source Internet Protocol ("IP") address, a source port, a destination IP address, and a destination port, and protocol parser 122 keeps track of which TCP connection the received data units belong to. In step 202, protocol parser 122 determines the data type of these data units based on the information in their payload fields.

As an illustration, suppose one of the transport service users is a SMTP client. The data units that this SMTP client receives are thus in the form of SMTP packets. Suppose further that this SMTP client also supports Multipurpose Internet Mail Extension ("MIME") and receives SMTP packets that are associated with the TCP 123 connection and collectively contain an email and an attachment file. For clarity of the discussions, unless otherwise indicated, references to these SMTP packets are meant to cover the packets containing the email, the email and the attachment file, or the attachment file. In this illustration, the first of these SMTP packets refers to the packet containing both the email and also a beginning portion of the attachment file. The subsequent SMTP packets refer to the packets containing the remaining portions of the attachment file. One embodiment of protocol parser 122 generates a MDPS-data-unit for each SMTP packet that it receives. In most instances, the subsequent MDPS-data-units have the same payload data as the subsequent SMTP packets.

After the TCP 123 connection is established and the required handshaking is completed pursuant to the SMTP protocol, the SMTP client begins to send the aforementioned SMTP packets to protocol parser 122. In this example, protocol parser 122 examines the payload data of the first SMTP packet in search of a boundary marker that indicates the beginning of the attachment file. At this boundary marker, protocol parser 122 retrieves certain information, such as the type of encoding for this attachment file, the existence of the attachment file, and the name of the attachment file. Based on the retrieved information, protocol parser 122 determines a data type for this first portion of the attachment file. So, if the type of encoding is base64, then protocol parser 122 denotes the data type of this first portion in step 202 to represent base64 encoding.

With at least the TCP 123 connection and the denoted data type information, protocol parser 122 requests MDPS 100 shown in FIG. 1 to decode the first portion of the attachment file in step 204. Specifically, one embodiment of protocol parser 122 in step 204 initiates the opening of a MDPS session by requesting for a MDPS session ID, which corresponds to a MDH in MDPS 100 that handles at least base64 decoding. Resource manager 104 of MDPS 100 shown in FIG. 1 maintains certain information of all the supported MDPS sessions in state table 106 as discussed above. If handler selector 102 of MDPS 100, working with resource manager 104, is able to reserve a MDPS session ID and indicates to protocol parser 122 in step 206 that the MDPS session ID is available for the TCP 123 connection, then the MDPS session is successfully established. Protocol parser 122 proceeds to generate and send the first MDPS-data-unit with this MDPS session ID, the established base64 encoding data type, a data ID, and the payload data in the first SMTP packet to MDPS 100 in step 210. In one implementation, each data ID distinctly maps to a MDPS-data-unit, so that protocol parser 122 has means to track the MDPS-data-unit and also allocate or de-allocate the resources relating to the MDPS-data-unit. On the other hand, if the MDPS session ID is not available, then protocol parser122 may notify the SMTP client of the resource unavailability in step 208 before attempting to open the MDPS session again. Alternatively, protocol parser 122 may request to have the resources reallocated, including, without limitation, releasing and making available the least recently used resources prior to notifying SMTP client of the resource unavailability.

Figure 2B:
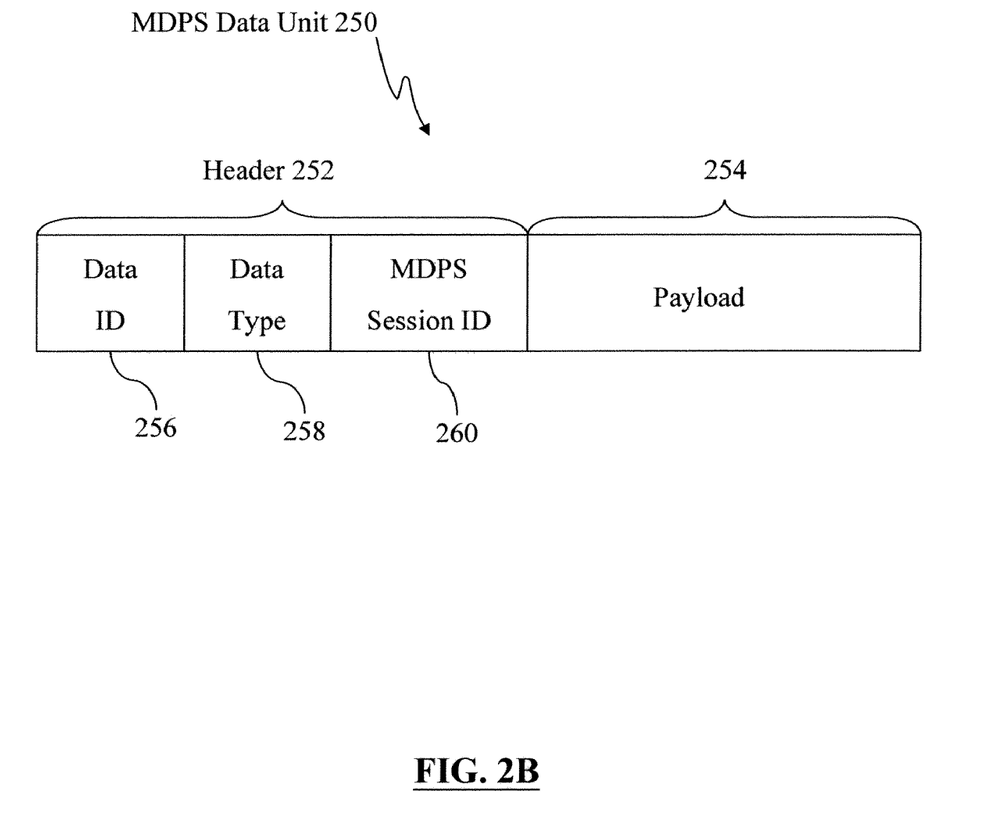
FIG. 2B is a conceptual diagram of a data-unit specifically for a multi-level data processing system, according to one embodiment of the present invention

FIG. 2B is a conceptual diagram of a MDPS-data-unit, such as MDPS-data-unit 250, according to one embodiment of the present invention. In particular, MDPS-data-unit 250 has two main fields, header field 252 and payload field 254. Header field 252 further includes at least three sub-fields, 256, 258, and 260, each of which contains the aforementioned data ID, data type, and MDPS session ID, respectively. Payload field 254 contains the payload data of a single SMPT packet.

Continuing with the aforementioned example, because the subsequent portions of the same attachment file belong to the same TCP connection and are likely to remain as base64 encoded, for each of the SMTP packets that contain these subsequent portions, protocol parser 122 generates a corresponding MDPS-data-unit with the same MDPS session ID and the same data type as the MDPS-data-unit for the first portion of the attachment file. In addition, protocol parser 122 examines each SMTP packet for a boundary marker that indicates the end of the attachment file. If the boundary marker is found and the last SMTP packet containing the remaining portion of the attachment file is identified in step 212, then protocol parser 122 initiates the closing of the MDPS session in step 214. On the other hand, if the boundary marker is not found, then protocol parser 122 continues to generate and send MDPS-data-units to MDPS 100 in step 210.

Protocol parser 122 is capable of handling different TCP connections in parallel. In other words, multiple instances of process 200 as shown in FIG. 2A and discussed above may occur concurrently. Moreover, it should be apparent to one with ordinary skill in the art to recognize that MDPS 100 may support an Application Programming Interface ("API") to facilitate the communication and interaction between MDPS 100 and modules such as protocol parser 122. For instance, the steps of opening a MDPS session and closing a MDPS session discussed above can be implemented as API calls that protocol parser 122 makes.

It should be noted that protocol parser 122 may not be able to precisely determine the data type of a data unit in certain situations. In such situations, data type subfield 258 as shown in FIG. 2B does not contain data type information. Instead, the subfield may contain information that indicates the shift of the data type identification task to MDPS 100.

1.2 Multi-Level Data Handler and Resource Management

Figure 3:
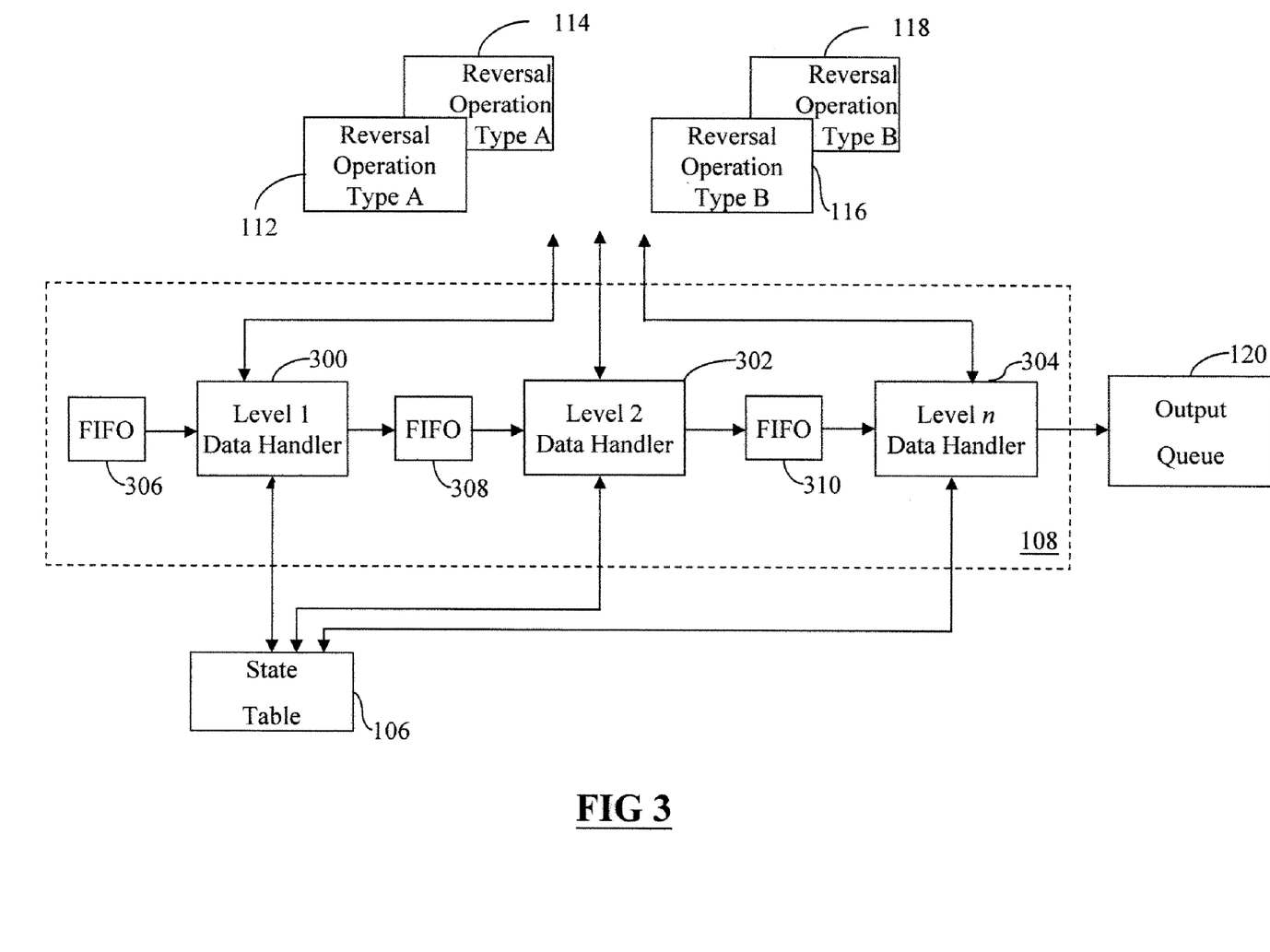
FIG. 3 is a conceptual diagram of one embodiment of a multi-level data processing system, which includes a number of single-level data handlers.

FIG. 3 is a conceptual diagram of one embodiment of a MDH, which includes a number of single-level data handlers. Suppose MDH 108 shown in FIG. 1 handles n levels of reversal operations. The implementation shown in FIG. 3 thus has n single-level data handlers, such as level 1 data handler 300, level 2 data handler 302, and level n data handler 304. Each of these single-level data handlers has access to at least one first-in-first-out ("FIFO") buffer, such as FIFO buffers 306, 308, and 310, and at least one data processing block, such as reversal operation type A blocks 112 and 114 and reversal operation type B blocks 116 and 118. The states of data processing for these single-level data handlers are captured and maintained in stable table 106 and can be accessible to the data handlers.

Figure 4A:
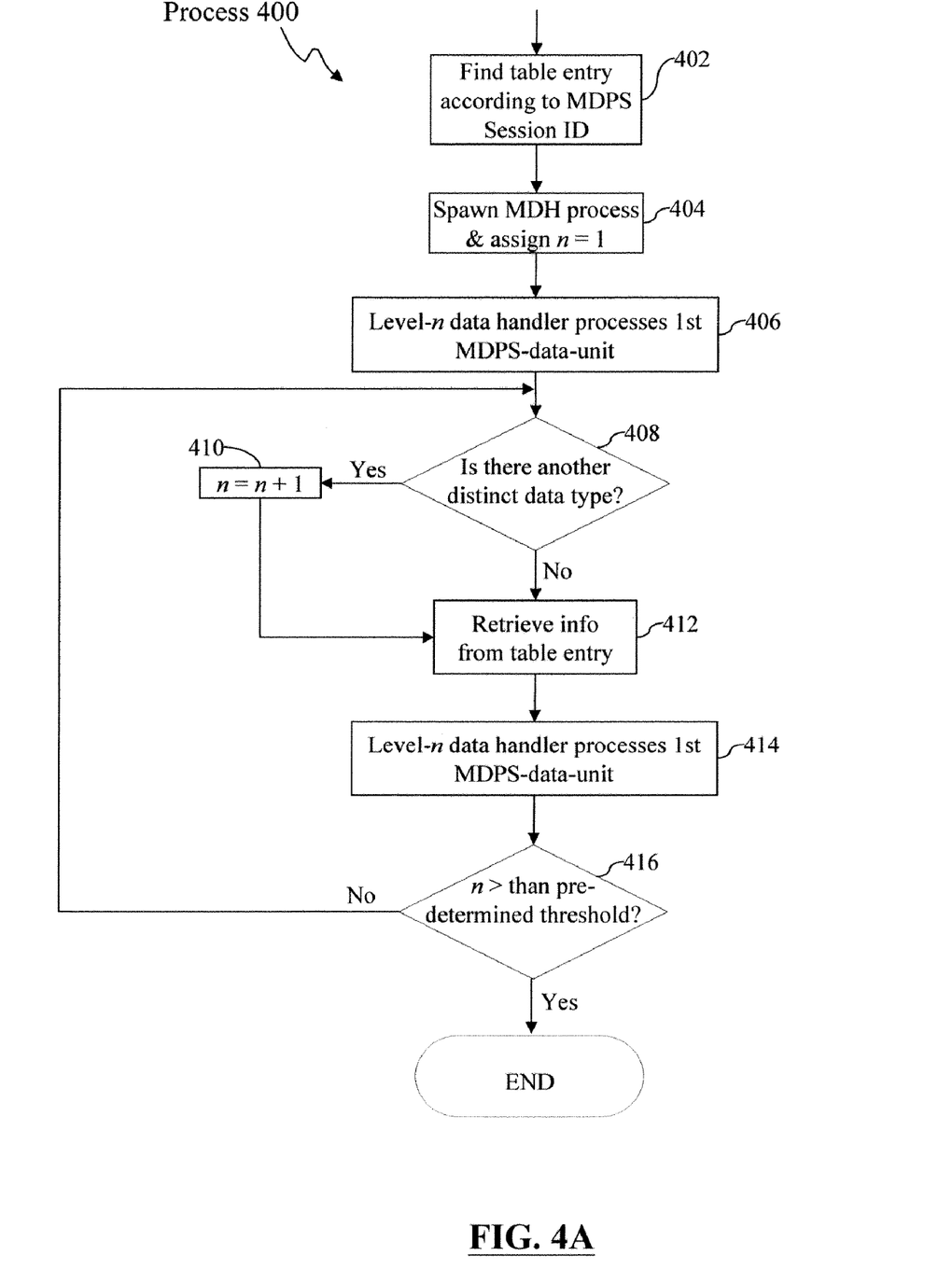
FIG. 4A is a flow diagram of one process that a handler selector and a multi-level data handler follow to process the first data-unit specifically for a multi-level data processing system.
Figure 5:
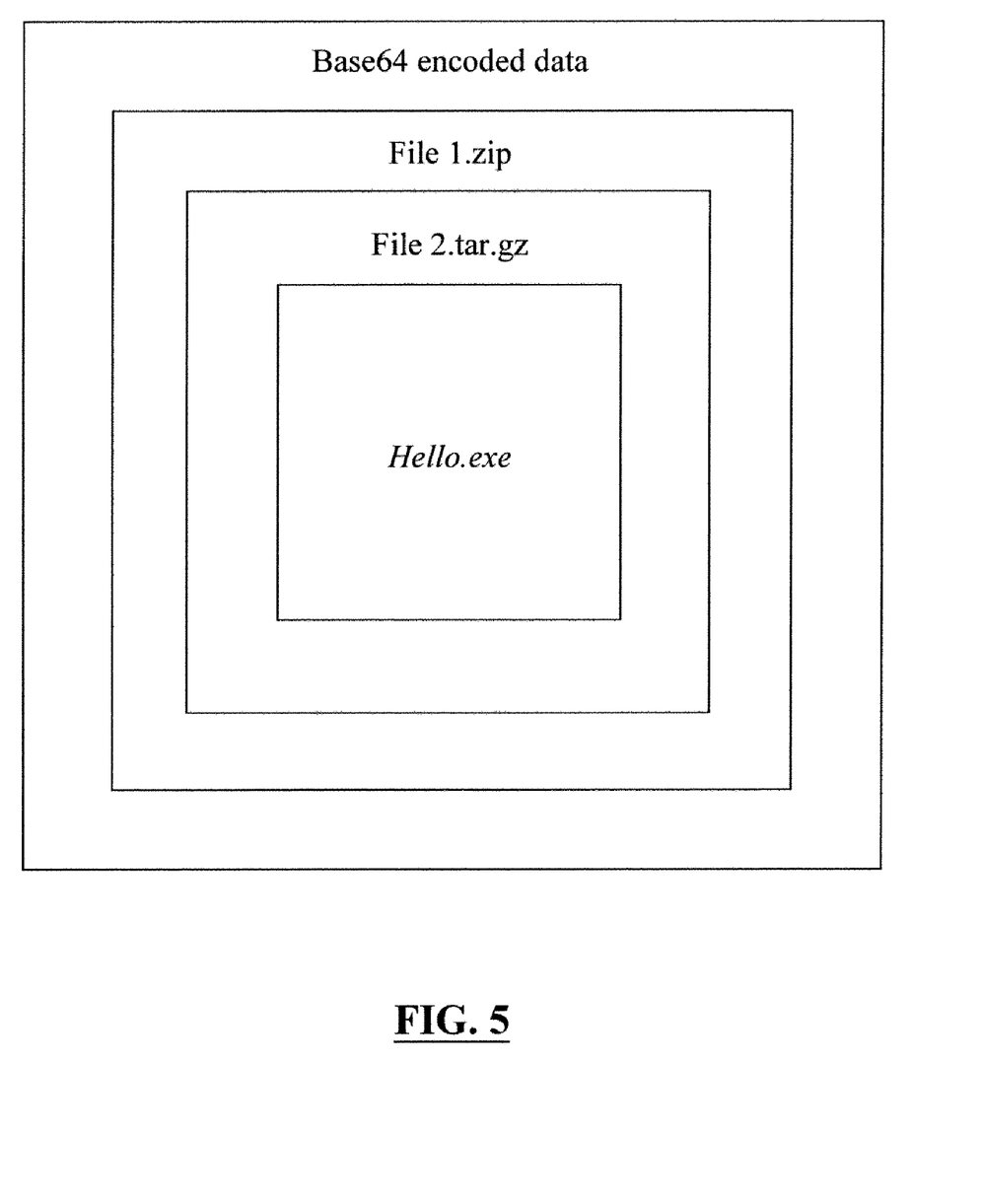
FIG. 5 is a conceptual diagram of a file, which is encoded, compressed, and archive.

To further describe the multi-level operations of MDH 108, FIG. 4A is a flow diagram of one process, process 400, that handler selector 102 and MDH 108 follow to process the first MDPS-data-unit after the establishment of a MDPS session. Suppose this MDPS session corresponds to the aforementioned TCP 123 connection in Section 1.1, in which an email and an attachment file are distributed among multiple SMTP packets. The MDPS session ID for this session is happy123. Suppose further that this attachment file has the file name of hello.exe and has undergone multiple levels of format conversions as shown in FIG. 5. Particularly, hello.exe has been archived, compressed, and encoded.

In conjunction with FIG. 1 and FIG. 2B, as handler selector 102 receives the first MDPS-data-unit from protocol parser 122 that contains the first portion of hello.exe, handler selector 102 extracts the MDPS session ID and the data type information from the header sub-fields of the MDPS-data-unit. The data type information should at least indicate that hello.exe has been base64 encoded. In step 402, handler selector 102 provides resource manager 104 with the extracted MDPS session ID to locate the corresponding table entry in stable table 106. In step 404, handler selector 102 spawns the process of MDH 108 and initializes an n variable, which tracks the number of levels of reversal operations MDH 108 has performed, to a value of 1. In step 406, based on the extracted data type information, MDH 108 proceeds to reserve and invoke the appropriate resources to perform the first level of reversal operation on the payload data of the first MDPS-data-unit. During this operation, MDH 108 stores various state information of the reversal operation in the table entry that is identified in step 402. One example of such state information is certain portions of the payload data in the first MDPS-data-unit, instead of being processed in the first MDPS-data-unit, are grouped with the payload data of the subsequent MDPS-data-units to be processed with the subsequent MDPS-data-units. More specifically, for decompressing payload data that are of the ZIP format, MDH 108 maintains at least a sliding window of a certain size of the payload data, such as 32 kilobytes, in the table entry. In other words, to decompress the payload data of a current MDPS-data-unit, the sliding window of data resulting from the processing of the immediately preceding MDPS-data-unit is considered. According to the embodiment of MDH 108 shown in FIG. 3 and continuing with the hello.exe example shown in FIG. 5, MDH 108 also invokes level 1 data handler 300 in step 404. The invoked level 1 data handler 300 reserves at least one FIFO buffer, such as FIFO buffer 306, and invokes at least one data processing block, such as reversal operation type A 112, to perform base64 decoding on the MDPS-data-unit in step 406. Moreover, prior to the completion of the base64 decoding of the entire first MDPS-data-unit by reversal operation type A 112, MDH 108 searches the decoded results in FIFO buffer 308 for another distinct data type in step 408. Because MDH 108 has the knowledge of the file name of the compressed hello.exe, file 1.zip, MDH 108 looks for certain patterns that are representative of a particular zip compression methods in the decoded results. For example, if MDH 108 finds the characters "PK" and other parameter values that are known to be used in PKZIP, then MDH 108 confirms that another distinct data type, PKZIPPED data, exists at this level and proceeds to increment the level variable, n, by 1 in step 410. Then MDH 108 invokes level 2 data handler 302, which retrieves information, if any, from the table entry in stable table 106 shown in FIG. 1 that corresponds to the MDPS Session ID of happy123 in step 412 before invoking reversal operation type B 116 to perform PKUNZIP operations on the first MDPS-data-unit in step 414.

Following the same process discussed above, MDH 108 continues to invoke single-level data handlers for different levels of processing, if MDH 108 continues to identify distinct data types and has not exceeded a threshold number of iterations of extracting a data type and utilizing appropriate resources for such data type. Thus, prior to the completion of the PKUNZIP operation on the first MDPS-data-unit, MDH 108 increments level variable n by 1 and invokes reversal operation type C (not shown in FIG. 1) in step 414 to unarchive the first MDPS-data-unit of File 2.tar.gz shown in FIG. 5. The use of this threshold number in step 416 is one method of avoiding performing an unusually large number of reverse operations. After all the multiple levels of processing, MDH 108 places the results in output queue 120 as shown in FIG. 1. One embodiment of content inspection engine 126 retrieves data from output queue 120 and inspects the data on a data-unit-by-data-unit basis for suspicious patterns.

Figure 4B:
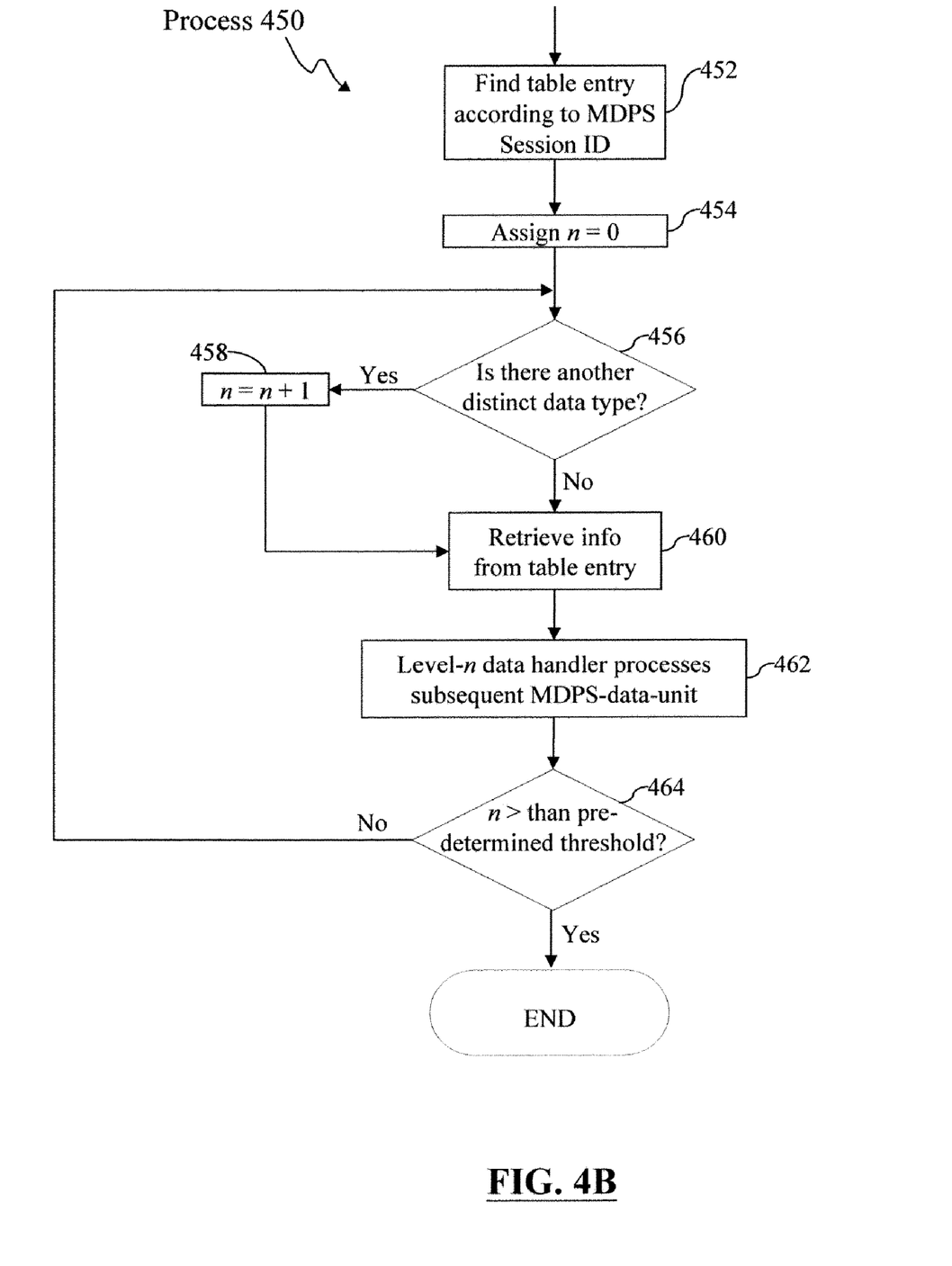
FIG. 4B is a flow diagram of one process that a handler selector and a multi-level data handler follow to process the subsequent data-unit specifically for a multi-level data processing system.

FIG. 4B is a flow diagram of one process, process 450, that handler selector 102 and MDH 108 follow to process the subsequent MDPS-data-unit after the establishment of a MDPS session. Process 450 and the aforementioned process 400 are essentially the same, except for at least the following differences: 1) since MDH 108 has been spawned in step 404 in process 400, the same MDH 108 continues to operate on the subsequent MDPS-data-units; and 2) the level variable n initially is set to 0 in step 454.

2.0 Example System Structure

Figure 6:
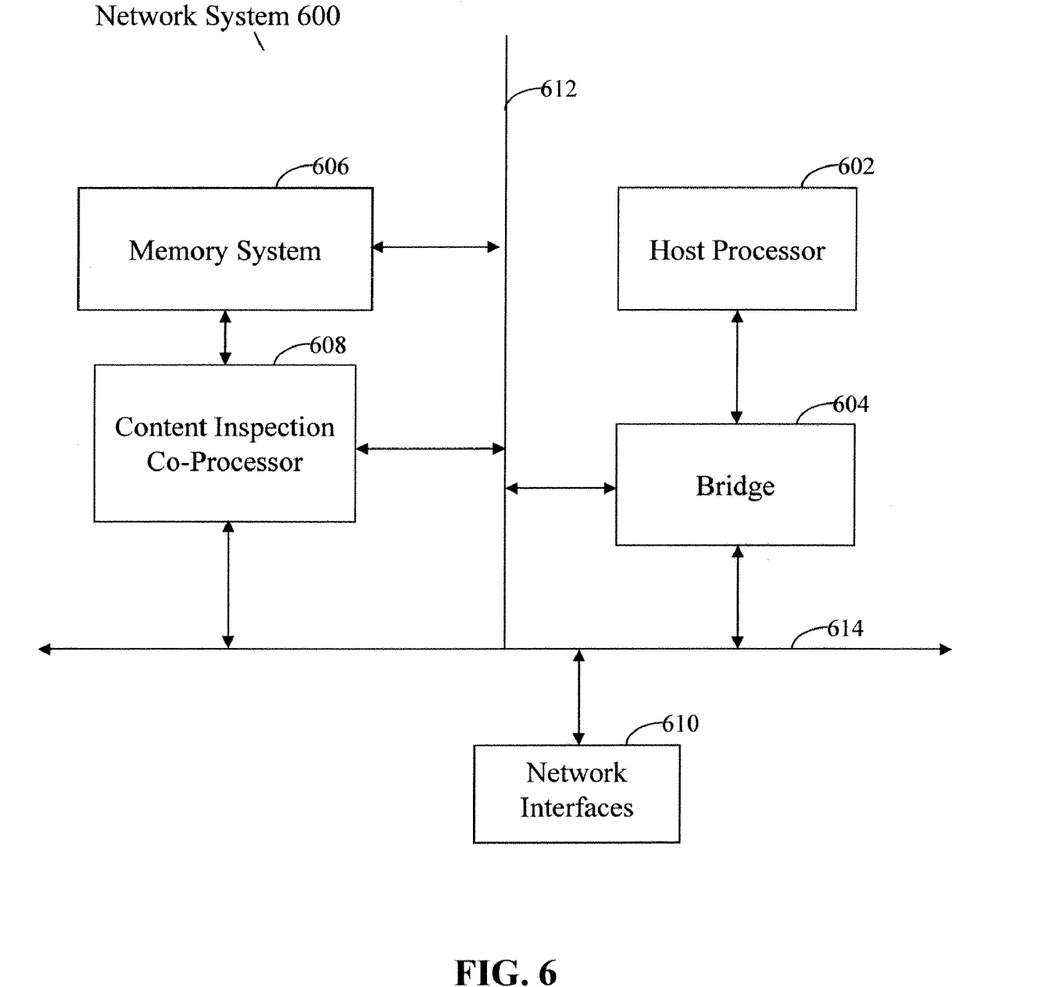
FIG. 6 is a block diagram that illustrates a network system, upon which an embodiment of the multi-level data processing system may be implemented.

FIG. 6 is a block diagram that illustrates one system, network system 600, upon which an embodiment of the multi-level data processing system may be implemented. Specifically, network system 600 includes host processor 602, bridge 604, memory system 606, content inspection co-processor ("CICP") 608, and network interfaces 610. Host processor performs the operations of protocol parser 122 and protocol service users 128 and 130 shown in FIG. 1 and accesses the resources of network system 600 via bridge 604. CICP 608 performs both the operations of the MDPS 100 and the content inspection tasks on a data-unit-by-data-unit basis. Network interfaces 610 support various network protocols and the related input/output ("I/O") functionalities and communicate with the rest of network system 600 via system bus 614. In this implementation, although both host processor 602 and content inspection co-processor 608 may have direct accesses to memory system 606, memory bus 612 is mainly responsible for transporting most of the memory access traffic in network system 600.

Host processor 602 can either be a general purpose processor or a specific purpose processor. Some examples of a specific purpose processor are processors that are designed for, without limitation, data communications, signal processing, mobile computing, and multimedia related applications. Specific purpose processors may include interfaces that other external units, such as memory system 606 and CICP 608, can directly connect to.

CICP 608 can be implemented as an application-specific integrated circuit ("ASIC"), as software to be programmed in a programmable logic device, or even as a functional unit in a system-on-chip ("SOC"). One or more of the components illustrated in FIG. 6 can be added (e.g., display device), combined (e.g., CICP 608 and host processor 602 can reside on a single SOC), or further divided (e.g., bridge 604 can be further divided into a host processor bridge, a bus controller, and a memory controller) and still remain within the claimed scope of the present invention.

Figure 7:
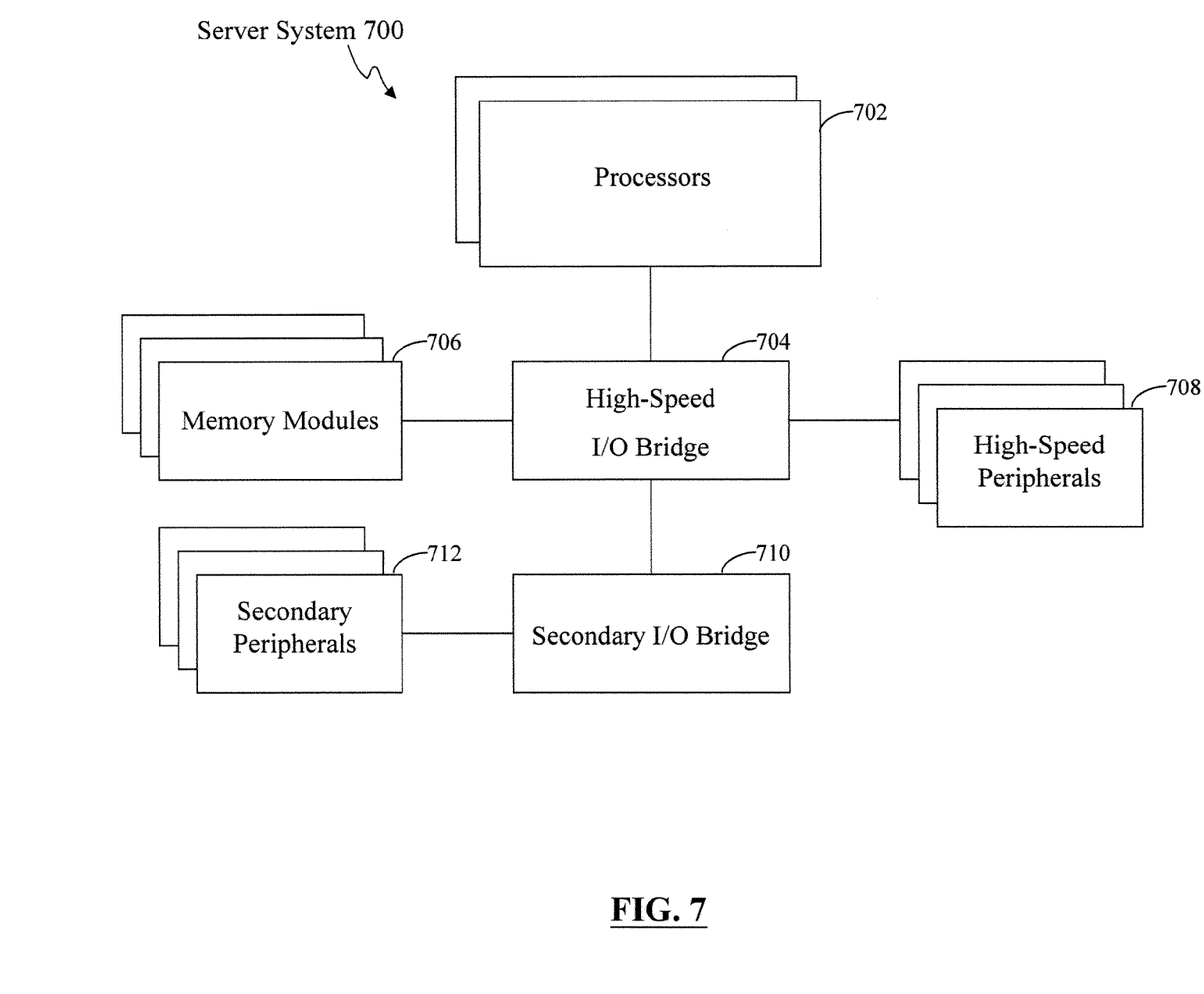
FIG. 7 is a block diagram that illustrates a server system, upon which an embodiment of the multi-level data processing system may be implemented.

FIG. 7 is a block diagram that illustrates another system, server system 700, upon which an embodiment of the multi-level data processing system may be implemented. Server system 700 includes a number of processors, such as processor 702, that access memory modules 706 via high speed I/O bridge 704. High speed I/O bridge 704 also manages the connections from processor 702 to on-chip memory modules, such as caches, and high speed interfaces, such as the Accelerated Graphics Port and the Peripheral Component Interfaces ("PCI") Express. Memory modules 706 store information and instructions to be executed by processor 712 and may store temporary variables or other intermediate information during the execution of the instructions.

High speed I/O bridge 704 manages the data-intensive pathways and supports high speed peripherals, such as, without limitation, a content inspection system that includes the aforementioned CICP 608 shown in FIG. 6, display, gigabit Ethernet, fiber channel, and Redundant Array of Independent Disks ("RAID"). High speed I/O bridge 704 is also coupled with secondary I/O bridge 710, which supports secondary peripherals 712, such as, without limitation, disk controllers, Universal Serial Bus ("USB"), audio, serial, system Basic Input/Output System ("BIOS"), the Industry Standard Architecture ("ISA") bus, the interrupt controller, and the Intelligent Driver Electronics ("IDE") channels.

Server system 700 carries out the operations of the illustrated transport service users 128 and 130 and protocol parser 122 shown in FIG. 1 by having processor 702 execute one or more sequences of one or more instructions contained in memory modules 706. Such instructions may be read into main memory modules 706 from another computer-readable medium, such as a storage device via secondary I/O bridge 710. Execution of the sequences of instructions contained in memory modules 706 causes processor 702 to perform the steps discussed in Section 1.1 above. In alternative embodiments, hard-wired circuitry may be used in place of or in combination with software instructions to implement the aforementioned operations.

The term "computer-readable medium" as used herein refers to any medium that participates in providing instructions to processor 702 for execution. Such a medium may take many forms, including but not limited to, non-volatile media and volatile media. Non-volatile media includes, for example, optical or magnetic disks. Volatile media includes dynamic memory.

3.0 Extensions and Alternatives

In the foregoing specification, the present invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for monitoring a data unit of a first file and a data unit of a second file by a multi-level data processing system, comprising:
    selecting first resources of said multi-level data processing system to iteratively reverse multiple levels of format conversions on the payload data of said data unit of said first file to generate a first reversed data unit, wherein said first file is associated with a first transport connection;
    in parallel with said selecting first resources, selecting second resources of said multi-level data processing system to iteratively reverse multiple levels of format conversions on the payload data of said data unit of said second file to generate a second reversed data unit, wherein said second file is associated with a second transport connection; and
    inspecting the payload data of said first reversed data unit and said second reversed data unit for suspicious patterns prior to any aggregation of the data units of said first file or said second file.

2. The method as recited in claim 1, further comprising:
    retrieving a first data type from the payload data of said data unit of said first file for each of said multiple levels of said format conversion, independently from retrieving a second data type from the payload data of said data unit of said second file for each of said multiple levels of said format conversion; and
    invoking a first reversal operation type from said first resources based on said first data type, independently from invoking a second reversal operation type from said second resources based on said second data type.

3. The method as recited in claim 2, further comprising:
    independently retrieving said first data type and said second data type for a second level of said multiple levels of said format conversions prior to the completion of reversing a first level of said multiple levels of said format conversions.

4. The method as recited in claim 1, further comprising:
    mapping said first resources to said first transport connection; and
    mapping said second resources to said second transport connection.

5. The method as recited in claim 4, further comprising:
    maintaining information relating to said first resources, said second resources, and the processing of said first resources and said second resources.

6. The method as recited in claim 3, further comprising:
    iteratively performing said retrieving step and said invoking step within a threshold number of iterations.

7. A system, comprising:
    a first processing means for identifying a first initial-level data type from a data unit of a first file on a first transport connection and in parallel for identifying a second initial-level data type from a data unit of a second file on a second transport connection;
    a second processing means for selecting first resources according to said first initial level data type to initiate reversing multiple levels of format conversions on the payload data of said data unit of said first file to generate a first reversed data unit and in parallel selecting second resources according to said second initial-level data type to initiate reversing multiple levels of format conversions on the payload data of said data unit of said second file to generate a second reversed data unit; and
    a third processing means for inspecting the payload data of said first reversed data unit and said second reversed data unit for suspicious patterns prior to any aggregation of the data units of said first file or said second file.

8. The system as recited in claim 7, wherein said second processing means further comprising:
    means for independently invoking a first reversal operation type from said first resources based on said first initial-level data type and invoking a second reversal operation type from said second resources based on said second initial-level data type.

9. The system as recited in claim 7, wherein said second processing means further comprising:
    means for independently determining a first current-level data type based on at least a portion of the results from performing a first preceding-level reversal operation type and determining a second current-level data type based on at least a portion of the results from performing a second preceding-level reversal operation type;
    means for independently invoking a first current-level reversal operation type from said first resources based on said first current-level data type and invoking a second current-level reversal operation type from said second resources based on said second current-level data type; and
    means for iteratively performing said determining step and said invoking step to reverse said multiple levels of said format conversions.

10. The system as recited in claim 7, wherein said second processing means further maps said first resources and said second resources to said first transport connection and said second transport connection, respectively.

11. The system as recited in claim 10, wherein said second processing means further comprising means for storing information relating to said first resources, said second resources, and the processing of said first resources and said second resources.

12. The system as recited in claim 7, wherein said first processing means further requests to establish a session with said second processing means for each of said first transport connection and said second transport connection.

13. The system as recited in claim 9, wherein said second means iteratively performs said determining step and said invoking step within a threshold number of iterations.

14. A system, comprising:
    a host processor,
    a content inspection co-processor, and
    a memory system, coupled to said host processor and said content inspection co-processor, wherein
    a protocol parser, when executed by said host processor, attempts to identify a first initial-level data type from a data unit of a first file on a first transport connection and in parallel attempts to identify a second initial-level data type from a data unit of a second file on a second transport connection;
    a data processing system, when executed by said content inspection co-processor, selects first resources according to said first initial-level data type to initiate reversing multiple levels of format conversions on the payload data of said data unit of said first file to generate a first reversed data unit and in parallel selects second resources according to said second initial-level data type to initiate reversing multiple levels of format conversions on the payload data of said data unit of said second file to generate a second reversed data unit; and a content inspection engine, when executed by said content inspection co-processor, inspects the payload data of said first reversed data unit and said second reversed data unit for suspicious patterns prior to any aggregation of the data units of said first file or said second file.

15. The system as recited in claim 14, wherein said data processing system further independently spawns a first process that utilizes said first resources and invokes a first reversal operation type based on said first initial-level data type and spawns a second process that utilizes said second resources and invoking a second reversal operation type based on said second initial-level data type.

16. The system as recited in claim 14, wherein said data processing system further:

independently spawns a first process and a second process, wherein said first process determines a first current-level data type based on at least a portion of the results from performing a first preceding-level reversal operation type, and said second process determines a second current-level data type based on at least a portion of the results from performing a second preceding-level reversal operation type;

said first process invokes a first current-level reversal operation type based on said first current-level data type, and said second process invokes a second current-level reversal operation type based on said second current-level data type; and said first process and said second process iteratively perform said determining step and said invoking step to reverse said multiple levels of said format conversions.

17. The system as recited in claim 16, wherein said data processing system further maps said first resources and said second resources to said first transport connection and said second transport connection, respectively.

18. The system as recited in claim 17, wherein said data processing system further comprising a stable table to store information relating to said first resources, said second resources, and the processing of said first resources and said second resources.

19. The system as recited in claim 14, wherein said protocol parser further requests to establish a session with said data processing system for each of said first transport connection and said second transport connection.

20. The system as recited in claim 16, wherein said first process and said second process iteratively perform said determining step and said invoking step within a threshold number of iterations.

* * * * *